(No Model.)

J. E. KEARNS.
DEVICE FOR PREVENTING THE FREEZING OF GAS IN PIPES.

No. 337,408. Patented Mar. 9, 1886.

Witnesses:
G. E. Holland
A. Keithley

Inventor,
John E. Kearns,
by A. B. Upham,
His Attorney.

UNITED STATES PATENT OFFICE.

JOHN E. KEARNS, OF PEORIA, ILLINOIS.

DEVICE FOR PREVENTING THE FREEZING OF GAS IN PIPES.

SPECIFICATION forming part of Letters Patent No. 337,408, dated March 9, 1886.

Application filed May 2, 1885. Serial No. 164,263. (No model.)

*To all whom it may concern:*

Be it known that I, JOHN E. KEARNS, of Peoria, in the county of Peoria, in the State of Illinois, have invented an Improved Device for Preventing the Freezing of Gas in Pipes; and I do hereby declare that the following is a full, clear, and exact description thereof, reference being had to the annexed drawings, making a part of this specification, in which like letters of reference refer to like parts, and in which—

Figure 1:
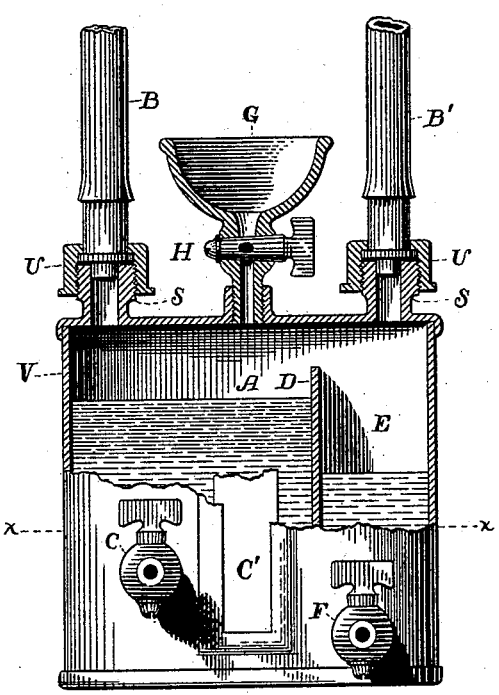
Figure 2:
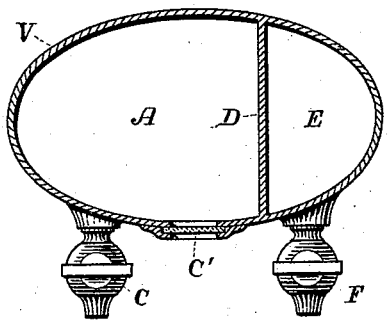

Figure 1 represents a side view of the device having a portion of its front side broken away. Fig. 2 is a horizontal section at X X in Fig. 1.

In very cold weather it is found that the moisture held in suspension in illuminating-gas often condenses and freezes in the pipes through which the gas is passing. The result is, that the gas-pipes in this way are extremely liable to become entirely obstructed, cutting off thereby the supply of illuminating-gas and causing much annoyance and trouble to the users. When gas-pipes have become thus obstructed, it is customary to thaw out the frozen moisture by forcing into the pipes a quantity of alcohol or wood-spirit, the vapor of which possesses the quality of melting such frozen moisture. So far as I know, however, no attempt has been made to prevent by such means any congelation of moisture in the pipes. To do this, which is the object of this invention, I introduce into a portion of the gas-pipe—usually where it leaves the meter—a chamber, into which is put a quantity of alcohol or similar anti-freezing liquid. As the illuminating-gas flows over this alcohol, the vapor of said volatile liquid unites with the gas and passes along with it to the place of danger and prevents the congelation of the watery vapor, which might otherwise occur thereat.

In the drawings, A is the reservoir for holding the alcohol. B represents a portion of the gas-pipe opening into said reservoir, and B' a portion of the gas-pipe passing from the same. As shown in Fig. 2, I usually make said reservoir elliptical in plan, in order that the flow of the passing gas may be in the direction of the length of said reservoir, and more vapor may be enabled to enter the gas. The sections B B' of pipe are connected to the reservoir A at its top and at the opposite ends thereof, and I generally join the said sections to said top by means of the screw-threaded stubs S, soldered or otherwise immovably united to said top, and the union-couplings U, as shown in Fig. 1.

To introduce the alcohol into the reservoir A, I provide the valve H, opening into the top of the reservoir, and form the cup or funnel G with said valve.

In a medium-sized reservoir the alcohol will last, with ordinary use of the gas, for some three or four weeks.

To enable the user to ascertain if there is sufficient alcohol in the reservoir, I either form the same with a glass panel, C', or furnish a cock, C, opening from the side thereof.

The moisture condensing in the pipe B', termed the "riser," is liable to trickle down and drop therefrom into the alcohol, thereby so diluting the same as in time to entirely destroy its anti-freezing power. To prevent this, I form the device with a second chamber or drip-cup, E, located just below the entrance to the riser B', and adapted to receive the drip therefrom. Said drip-cup is formed by means of the vertical partition D, separating the same from the reservoir A. The upper edge of said partition is sufficiently below the top of the vessel V to permit the easy passage thereover of the gas from the section of pipe B to the other section or riser, B'. The drip-cup E is provided with a cock, F, by which to withdraw the water accumulating therein.

I am aware that, prior to my invention, devices for the same purpose were constructed in which the flowing gas was compelled to pass over the surface of a quantity of alcohol contained in a reservoir connected with the gas-pipe, so that I do not broadly claim the same; but What I do claim, and for which I desire Letters Patent, is as follows, to wit:

1. In a means for preventing the freezing of gas in pipes, the vessel V, divided into two chambers by the vertical partition D, one of which chambers forms the alcohol-reservoir, and the other of which the drip-cup, in combination with the two sections of gas-pipe B B', opening into said vessel at widely-separate points in the top thereof, the outflowsection B' having its mouth located directly over said drip-cup, substantially as and for the purpose specified.

2. The vessel V, divided into the reservoir A and drip-cup E by the incomplete vertical partition D, the cock F, opening from said drip-cup, and means for permitting the introduction of alcohol into said reservoir, in combination with the two sections of gas-pipe B B', opening into the top of said vessel, substantially as set forth.

In testimony that I claim the foregoing as my invention I have hereunto set my hand this 25th day of April, 1885.

JOHN E. KEARNS.

In presence of—
A. B. UPHAM,
ARTHUR KEITHLEY.